(12) United States Patent
Nakamura et al.

(10) Patent No.: US 12,233,839 B2
(45) Date of Patent: Feb. 25, 2025

(54) REDUNDANCY BASED ELECTRIC BRAKE FAILURE DETECTION METHOD AND DEVICE USING THE SAME

(71) Applicant: Hitachi Astemo, Ltd., Hitachinaka (JP)

(72) Inventors: Toshiaki Nakamura, Tokyo (JP); Tohma Yamaguchi, Hitachinaka (JP); Asahi Watanabe, Hitachinaka (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 511 days.

(21) Appl. No.: 17/439,939

(22) PCT Filed: Mar. 18, 2020

(86) PCT No.: PCT/JP2020/012137
§ 371 (c)(1),
(2) Date: Sep. 16, 2021

(87) PCT Pub. No.: WO2020/217795
PCT Pub. Date: Oct. 29, 2020

(65) Prior Publication Data
US 2022/0185250 A1    Jun. 16, 2022

(30) Foreign Application Priority Data

Apr. 24, 2019   (JP) ................. 2019-082606

(51) Int. Cl.
*B60T 8/88*    (2006.01)
*B60T 8/171*   (2006.01)
(Continued)

(52) U.S. Cl.
CPC .............. *B60T 8/885* (2013.01); *B60T 8/171* (2013.01); *H02P 3/04* (2013.01); *H02P 3/08* (2013.01);
(Continued)

(58) Field of Classification Search
None
See application file for complete search history.

(56) References Cited

U.S. PATENT DOCUMENTS

| 6,351,048 B1 | 2/2002 | Schob et al. |
| 2003/0085678 A1 | 5/2003 | Yamada et al. |

(Continued)

FOREIGN PATENT DOCUMENTS

| CN | 109075734 A | 12/2018 |
| DE | 10 2007 029 662 A1 | 1/2008 |

(Continued)

OTHER PUBLICATIONS

Translation of JP 2020162197 A (retrieved 2024). (Year: 2019).*

(Continued)

*Primary Examiner* — James J Lee
*Assistant Examiner* — Jonathan E Reinert
(74) *Attorney, Agent, or Firm* — Foley & Lardner LLP

(57) ABSTRACT

A motor control device is provided which achieves redundancy while suppressing an increase in the number of parts and connection signal lines. The device includes angle sensors for detecting a rotation angle of a motor, a first microcomputer unit for controlling the motor based on a stroke sensor and receiving the detected value of the angle sensor, a second microcomputer unit for controlling the motor based on the stroke sensor and receiving the detected value of the angle sensor, and communication units for transmitting and receiving signals between the microcomputer units. The first microcomputer unit includes an angle sensor failure detecting unit for detecting a failure of the angle sensors, according to the detected value of the angle sensors, and a control angle of the motor created in response to the stroke sensor.

6 Claims, 7 Drawing Sheets

(51) Int. Cl.
*H02P 3/04* (2006.01)
*H02P 3/08* (2006.01)
*H02P 101/45* (2016.01)

(52) U.S. Cl.
CPC ..... *B60T 2220/04* (2013.01); *B60T 2270/413* (2013.01); *H02P 2101/45* (2015.01); *H02P 2203/03* (2013.01)

(56) References Cited

U.S. PATENT DOCUMENTS

| | | | | |
|---|---|---|---|---|
| 2006/0163939 | A1* | 7/2006 | Kuramochi | B60T 8/885 303/122.04 |
| 2007/0035178 | A1* | 2/2007 | Suzuki | B60T 8/885 303/122.05 |
| 2008/0011560 | A1 | 1/2008 | Yamaguchi et al. | |
| 2018/0072295 | A1 | 3/2018 | Masuda | |
| 2018/0183366 | A1 | 6/2018 | Hara et al. | |
| 2018/0229761 | A1 | 8/2018 | Fujita et al. | |
| 2020/0023887 | A1 | 1/2020 | Sasaki et al. | |
| 2020/0173814 | A1 | 6/2020 | Kinugasa | |
| 2020/0300671 | A1 | 9/2020 | Mori et al. | |

FOREIGN PATENT DOCUMENTS

| | | |
|---|---|---|
| DE | 10 2018 202 052 A1 | 8/2018 |
| JP | 2001-016887 A | 1/2001 |
| JP | 2002-276704 A | 9/2002 |
| JP | 2003-153401 A | 5/2003 |
| JP | 2009-067264 A | 4/2009 |
| JP | 4997219 B2 | 8/2012 |
| JP | 2016-215887 A | 12/2016 |
| JP | 2017-017910 A | 1/2017 |
| JP | 2017-163776 A | 9/2017 |
| JP | 6340658 B2 | 6/2018 |
| WO | WO-2018/051550 A1 | 3/2018 |
| WO | WO-2019/031218 A1 | 2/2019 |

OTHER PUBLICATIONS

International Search Report with English translation and Written Opinion issued in corresponding application No. PCT/JP2020/012137 dated Jun. 2, 2020.

Office Action issued in corresponding Korean Patent Application No. 10-2021-7029616, with English Machine Translation dated Jan. 26, 2023 (10 pages).

Chinese 2nd Office Action issued in the Chinese Application No. 202080022908.6 dated May 17, 2024.

German Office Action issued in corresponding DE Application No. 112020000915.7, dated Nov. 27, 2024 with English translation (19 pages).

* cited by examiner

FIG. 7

| A | B | C | ANGLE SENSOR 1 | ANGLE SENSOR 2 | MOTOR CONTROL SYSTEM |
|---|---|---|---|---|---|
| 0 | 0 | 0 | NG | NG | NG |
| 0 | 0 | 1 | NG | OK | OK |
| 0 | 1 | 0 | OK | NG | OK |
| 1 | 0 | 0 | OK | OK | NG |
| 1 | 1 | 1 | OK | OK | OK |

The Y column spans ANGLE SENSOR 1, ANGLE SENSOR 2, and MOTOR CONTROL SYSTEM.

REDUNDANCY BASED ELECTRIC BRAKE FAILURE DETECTION METHOD AND DEVICE USING THE SAME

TECHNICAL FIELD

The invention relates to a motor control device and an electric brake device using the same, and a motor controlling method and an electric brake controlling method using the same controlling method.

BACKGROUND ART

In these days, electrical motorization of vehicles has been advancing, and application of motor control by electric motorization of brake, steering, and the like has been expanding. Therefore, it is the most important object to improve a reliability not only in a motor but also in an electric and electronic system including a sensor for detecting the operational state of a motor, an MPU for performing a control, and the like. Particularly, a failure diagnosis function is important in a sensor for detecting the operation state of a control system.

As a sensor failure diagnosis technology, some devices as described, for example, in Patent Literature 1 and Patent Literature 2 have been proposed.

Patent Literature 1 discloses a technique in which: a motor position sensor for detecting a rotation position (angle) of a motor rotor and two output shaft sensors for detecting each rotation angle of the motor output shaft are provided; when a difference between the two output shaft sensors is a predetermined value or more, it is determined that any or both of the output shaft sensors are abnormal; then, it is determined presence or absence of abnormality in the motor position sensor; and when the motor position sensor is abnormal, a motor control is stopped, while when the motor position sensor is normal, the motor position sensor calculates an output shaft rotation angle.

Further, Patent Literature 2 discloses a technique in which two temperature sensors are connected to separate MPUs and a sub MPU diagnoses a main MPU and a temperature sensor connected thereto.

CITATION LIST

Patent Literature

Patent Literature 1: Japanese Patent No. 6340658
Patent Literature 2: Japanese Patent No. 4997219

SUMMARY OF INVENTION

Technical Problem

In Patent Literature 1, since a motor position sensor of another type is prepared for diagnosis of the two output shaft sensors and connected to the MPU, the number of parts and the number of connection signal lines for connecting the sensors and the MPU increase and there is a probability that a failure may happen in the increased parts and a disconnection may happen in the signal lines, which deteriorates the reliability.

Further, in Patent Literature 2, when a failure happens on the sub MPU side, a diagnosis of the main MPU side cannot be performed, and therefore, the processing is stopped.

In order to solve the above problems, an object of the invention is to provide a motor control device and an electric brake device using the same, and a motor controlling method and an electric brake controlling method using the same controlling method capable of achieving a redundancy while suppressing an increase in the number of the parts and the number of the connection signal lines.

Solution To Problem

In order to achieve the above object, the invention is characterized by comprising a first angle sensor and a second angle sensor for detecting a rotation angle of a motor, a first control circuit for controlling the motor based on a command value and receiving the detected value of the first angle sensor, a second control circuit for controlling the motor based on the command value and receiving the detected value of the second angle sensor, and a communication unit for transmitting and receiving signals between the first control circuit and the second control circuit, in which the first control circuit includes an angle sensor failure detecting unit for detecting a failure of the first angle sensor and the second angle sensor, according to the detected value of the first angle sensor, the detected value of the second angle sensor received through the communication unit, and the control angle of the motor created in response to the command value.

Advantageous Effects of Invention

According to the invention, it is possible to provide a motor control device and an electric brake device using the same, and a motor controlling method and an electric brake controlling method using the same method capable of realizing a redundancy while suppressing an increase in the number of the parts and the number of the connection signal lines.

BRIEF DESCRIPTION OF DRAWINGS

FIG. 7 is a view showing a determination example by the angle sensor failure detecting unit according to the first embodiment of the invention.

DESCRIPTION OF EMBODIMENTS

Hereinafter, embodiments of the invention will be described with reference to the drawings. The invention relates to a motor control device and the description will be made hereinafter, as one example, in the case of applying the above to an electric brake control device.

Various components of the invention do not have to be individually independent from each other but one component may be formed of a plurality of materials, a plurality of components may be formed of one material, one component may be formed of a part of another component, or a part of one component may overlap with a part of another component.

First Embodiment

Figure 1:
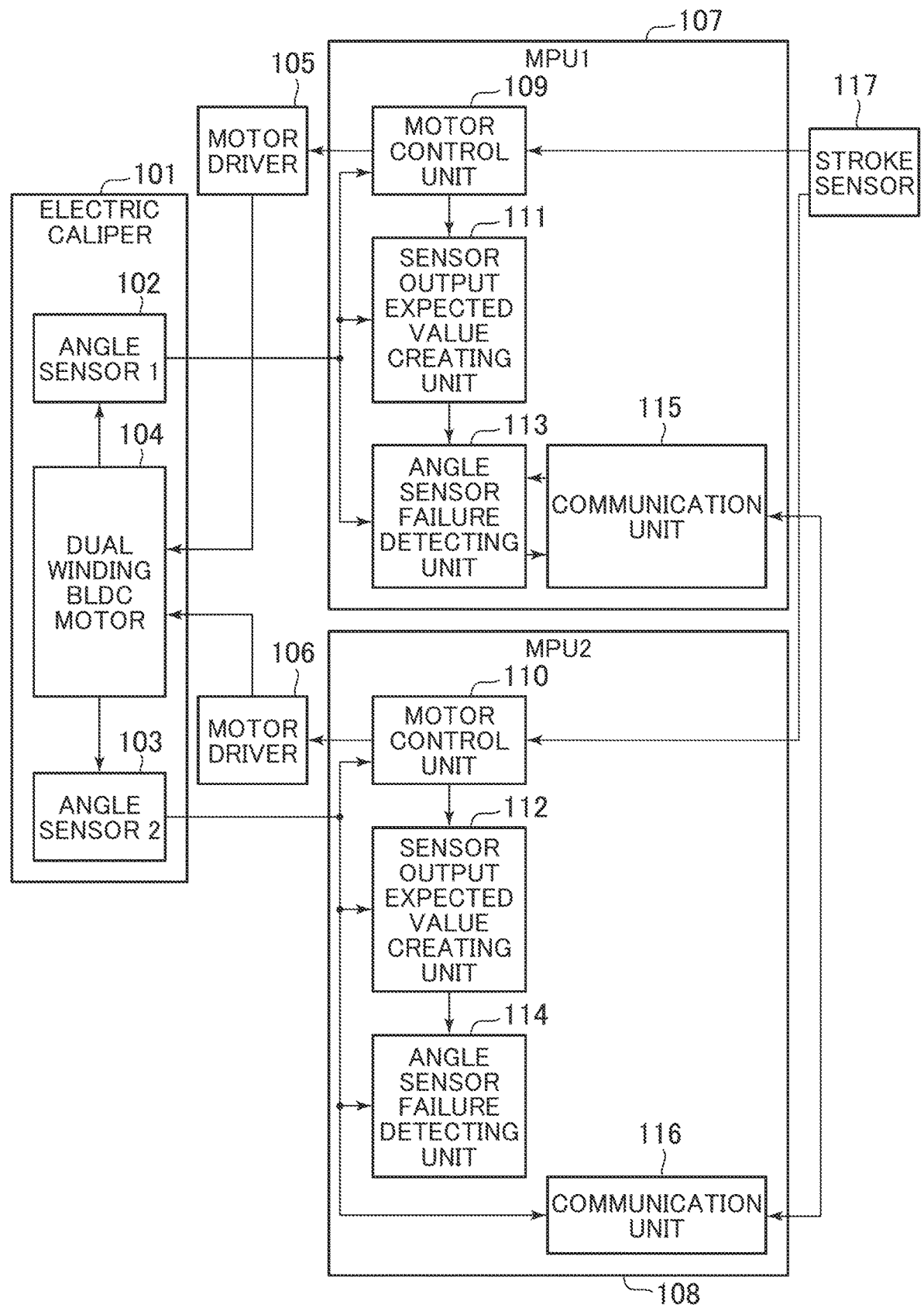
FIG. 1 is a block constitution view of an electric brake control device according to a first embodiment of the invention.

FIG. 1 is a block constitution view of an electric brake control device according to a first embodiment of the invention. In FIG. 1, an electric caliper 101 is a part forming a disk brake of a tire in a vehicle, provided with a function of controlling the opening and closing of a brake pad pinching the brake disk according to a motor.

In this embodiment, a dual winding brushless DC motor is used.

An angle sensor 102 (first angle sensor) and an angle sensor 103 (second angle sensor) included in the electric caliper 101 are means for detecting each rotation angle of a shaft of the dual winding brushless DC motor 104 and generally, a resolver is well-known.

The dual winding brushless DC motor 104 as a driving unit of the electric caliper 101 is composed of two systems each having three coil windings arranged around a rotor, and when some winding of one system is broken, the windings of the other system can pass a current, hence to prevent a rotation stop of the motor. Thus, three phase currents of the two systems are input to the respective coils. As a control example, two coils generate each rotation force of 50% normally, resulting in a total of 100% of the rotation force; however, when one of the coils fails, the other is used to generate the rotation force, hence to prevent a reduction in the rotation force.

Motor drivers 105 and 106 are means for outputting each three-phase current necessary for driving the motor, according to a control signal from a motor control unit 109 included in a MPU 107 (microcomputer unit) as a first control circuit and a control signal from a motor control unit 110 included in a MPU 108 as a second control circuit.

The MPUs 107 and 108 are means for, upon receipt of an input signal from the stroke sensor 117, controlling the motor within the electric caliper, in response to the signal, to operate the electric brake. In this embodiment, a redundant configuration is taken, provided with two MPUs for realizing one fail operational technology (1 Fail Operational). According to the one fail operational technology, when one of the main parts forming the system fails and loses the function, the other part substitutes for a part of the function to continue driving for a predetermined period of time.

The motor control units 109 and 110 are means for operating the motor for the angle corresponding to the input signal from the stroke sensor 117. The structure of the motor control units 109 and 110 will be described later with reference to FIG. 4.

Sensor output expected value creating units 111 and 112 are means for creating each output expected value for determining whether or not each output of the angle sensors 102 and 103 is normal. The structure of the sensor output expected value creating units 111 and 112 will be described later with reference to FIG. 5.

Angle sensor failure detecting units 113 and 114 are means for determining whether or not the respective angle sensors are normal. The structure of the angle sensor failure detecting units 113 and 114 will be described later with reference to FIG. 6.

Communication units 115 and 116 are means for transmitting and receiving data between the MPUs 107 and 108. For example, the above units are realized by the CAN communication method that is the communication standard for vehicle.

The stroke sensor 117 is a means for detecting a stepping amount when a driver steps on the brake pedal. To achieve a redundant configuration, the above includes two stepping amount detecting units, with the outputs thereof respectively connected to the MPU 107 and the MPU 108.

Next, the operation in the block diagram as shown in FIG. 1 will be described. When a driver steps on the brake pedal during driving a vehicle with the electric brake including the motor control devices according to the first embodiment mounted there, the stroke sensor 117 detects the amount of stepping change, and the motor control unit 109 and the motor control unit 110 in the MPU 107 and the MPU 108 receive the detected values. The motor control unit 109 and the motor control unit 110 control the rotation amount and the rotation speed of the motors in accordance with the stepping changing amount per unit of time, to rotate the dual winding brushless DC motor 104 in the electric caliper 101. The angle sensor 102 and the angle sensor 103 detect the rotation angle per control unit time of the motor, and the MPU 107 and the MPU 108 receive the detected values to feed back the above to the motor control unit 109 and the motor control unit 110. According to the above control, a braking operation is performed by controlling a frictional force between the brake pad and the brake disk in the electric caliper.

Figure 2:
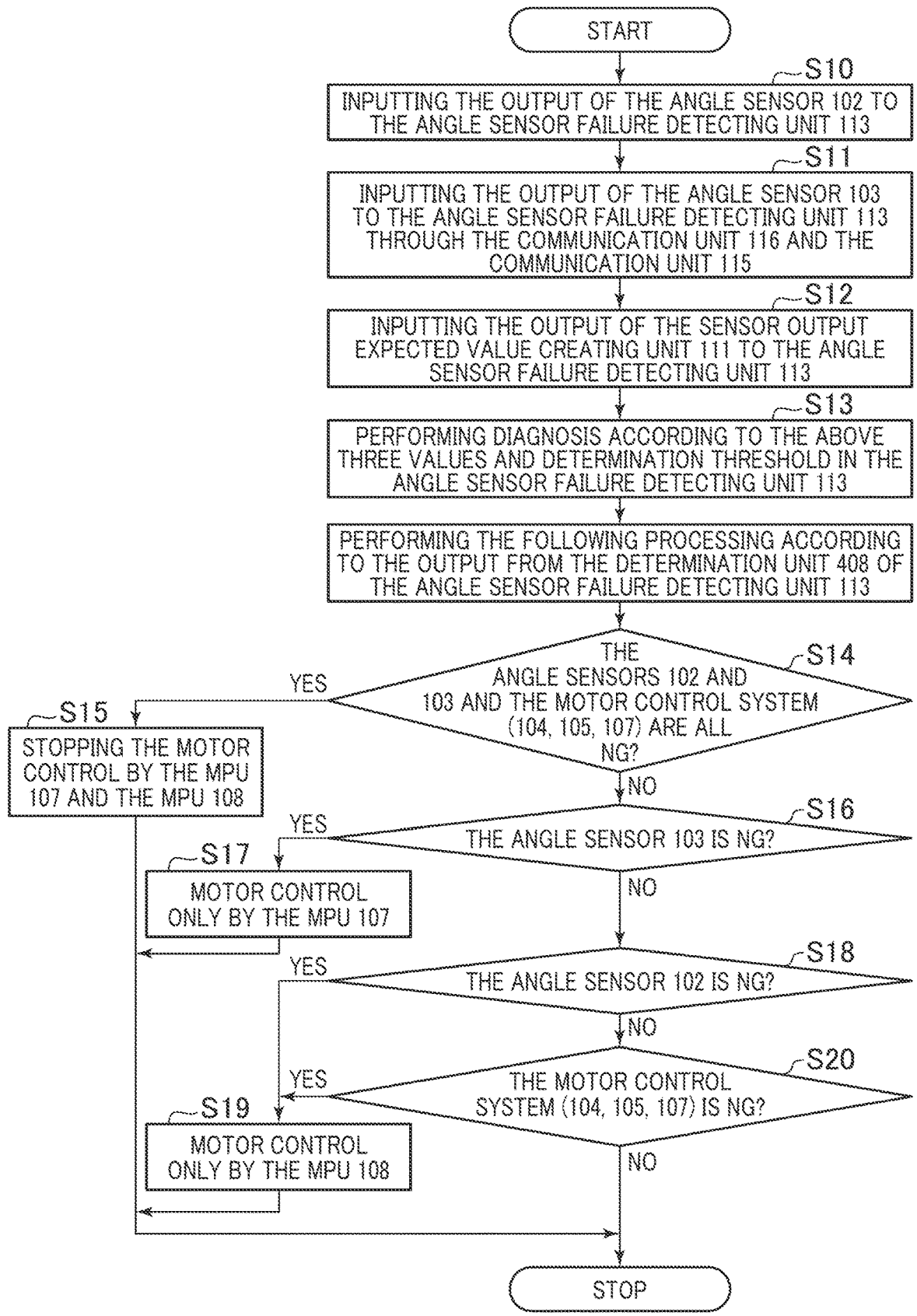
FIG. 2 is a flow chart of a failure detecting method of an angle sensor according to the first embodiment of the invention.

Next, a failure detecting method of the angle sensor will be described with reference to FIG. 2. FIG. 2 is a flow chart of the failure detecting method of the angle sensor according to the first embodiment of the invention and a flow chart at the start of running and the normal operation.

The angle sensor 102 detects an angle of the dual winding brushless DC motor 104 and inputs the output value (detected value) to the angle sensor failure detecting unit 113 in the MPU 107 (Step S10). In other words, the MPU 107 receives the detected value of the angle sensor 102.

The angle sensor 103 detects an angle of the dual winding brushless DC motor 104, the MPU 108 receives the output value (detected value), and the above value is input through the communication unit 116 of the MPU 108 and the communication unit 115 of the MPU 107 to the angle sensor failure detecting unit 113 in the MPU 107 (Step S11).

The sensor output expected value creating unit 111 creates a control angle of the motor in response to the stroke sensor 117 and inputs the above to the angle sensor failure detecting unit 113 (Step S12).

The angle sensor failure detecting unit 113 compares three outputs of the angle sensor 102, the angle sensor 103, and the sensor output expected value creating unit 111 with a determination threshold and performs a failure diagnosis (Step S13). The determination threshold becomes a reference for determining the presence or absence of a failure diagnosis. In the failure diagnosis, the following processing is performed according to the output from a determination unit 408 of the angle sensor failure detecting unit 113 described later.

When a difference of the three outputs is within a threshold, it is determined that a motor control system including the two angle sensors, the motor 104, and the MPUs 107 and 108 is normal (No in Step S14). When the difference is out of the threshold, it is determined that the motor control system including the two angle sensors, the motor 104, and the MPUs 107 and 108 is abnormal (Yes in Step S14), and then, a motor control by the MPU 107 and the MPU 108 is stopped (Step S15).

Next, an output of the angle sensor 102 and a failure of the angle sensor 103 are determined. When an output difference between the output value of the angle sensor 103 obtained through the communication units 116 and 115 and the output value of the sensor output expected value creating unit 111 is out of a predetermined threshold, the angle sensor 103 is determined to fail (Yes in Step S16). When the angle sensor 103 is determined to fail, the motor control by the MPU 108 is stopped and only the MPU 107 performs the motor control (Step S17). In this case, the angle sensor failure detecting unit 113 outputs a stop command to the motor control unit 110 in the MPU 108 through the communication unit 115.

On the other hand, when the output difference between the output value of the angle sensor 103 obtained through the communication units 116 and 115 and the output value of the sensor output expected value creating unit 111 is within the threshold, the angle sensor 103 is determined to be normal (No in Step S16).

Next, when an output difference between the output value of the angle sensor 102 and the output value of the sensor output expected value creating unit 111 is out of the threshold, the angle sensor 102 is determined to fail (Yes in Step S18). When the angle sensor 102 is determined to fail, only the MPU 108 performs the motor control (Step S19).

On the other hand, when the output difference between the output value of the angle sensor 102 and the output value of the sensor output expected value creating unit 111 is within the threshold, the angle sensor 102 is determined to be normal (No in Step S18).

Then, when the output difference between the two sensors (angle sensors 102 and 103) is within the threshold and the output of the sensor output expected value creating unit 111 and the output difference are out of the threshold, the motor control system is determined to fail (Yes in Step S20). When the motor control system is determined to fail, only the MPU 108 performs the motor control (Step S19).

On the other hand, when the output difference between the two sensors (the angle sensors 102 and 103) is within the threshold and the output of the sensor output expected value creating unit 111 and the output difference are within the threshold, the motor control system is determined to be normal (No in Step S20) and the motor control is continued.

Figure 3:
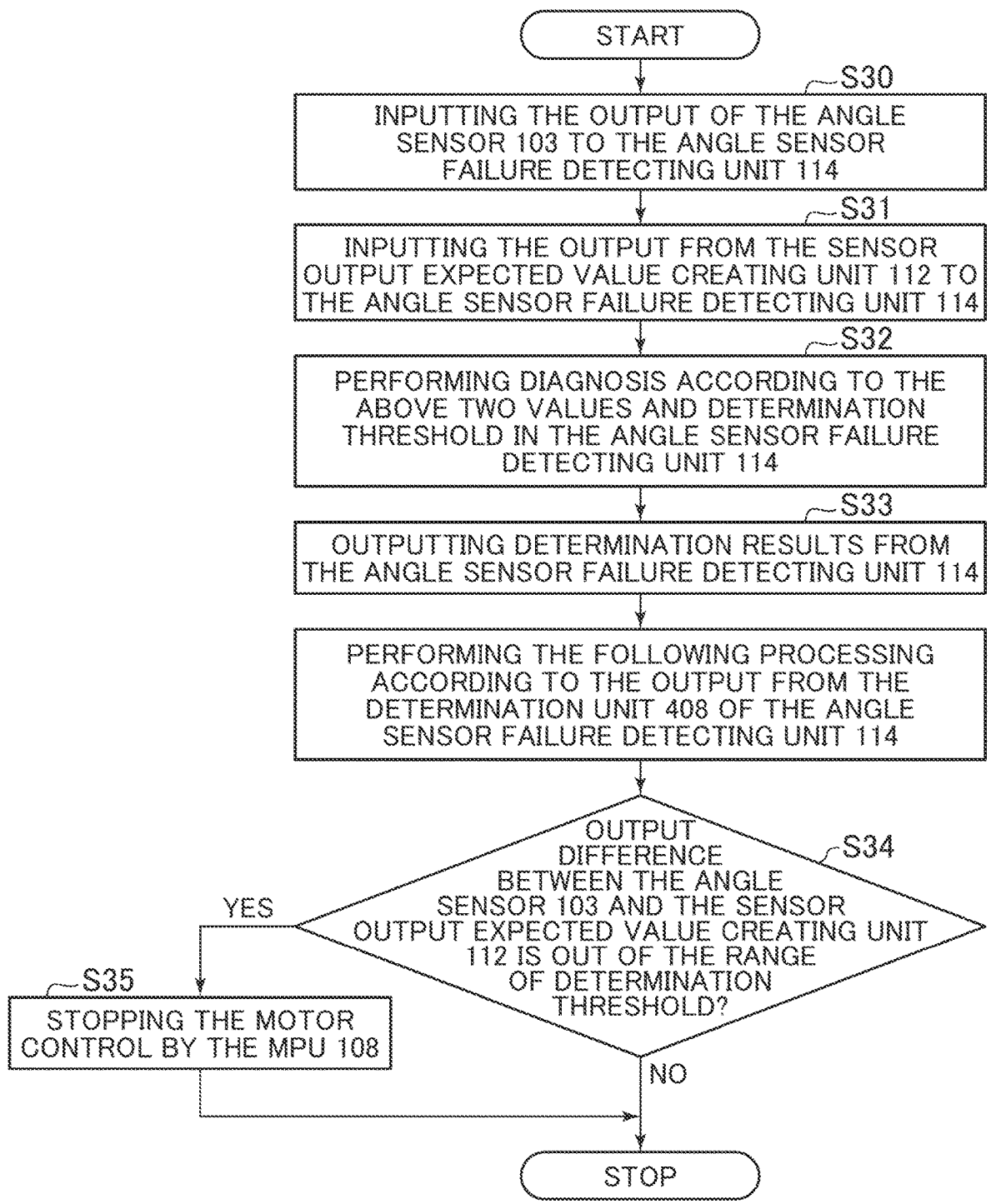
FIG. 3 is a flow chart when a motor control is performed by only one MPU according to the first embodiment of the invention.

The above steps are performed at predetermined time intervals (for example, 1 ms) during the operation of the motor. Next, with reference to FIG. 3, a description will be made about the failure diagnosis in the case of performing the motor control only by the MPU 108. FIG. 3 is a flow chart for performing the failure diagnosis in the case of performing the motor control only by the MPU on one side according to the first embodiment of the invention.

In Step S18 of FIG. 2, when only the MPU 108 performs the motor control, the failure diagnosis is performed according to the following flow.

In FIG. 3, an angle of the dual winding brushless DC motor 104 is detected by the angle sensor 103 and the output value thereof is input to the angle sensor failure detecting unit 114 in the MPU 108 (Step S30). In other words, the MPU 108 receives the detected value of the angle sensor 103.

The sensor output expected value creating unit 112 creates a control angle of the motor in response to the stroke sensor 117 and inputs the above to the angle sensor failure detecting unit 114 (Step S31).

The angle sensor failure detecting unit 114 compares two outputs of the angle sensor 103 and the sensor output expected value creating unit 111 with the determination threshold to perform the failure diagnosis (Step S32) and outputs the determination results (Step S33). The failure diagnosis is performed according to the following processing according to the output from the determination unit of the angle sensor failure detecting unit 114 described later.

When a difference between the output value of the angle sensor 103 and the output of the sensor output expected value creating unit 112 is out of the range of the determination threshold, the angle sensor 103 and the motor control system are determined to fail (Yes in Step S34) and the motor control by the MPU 108 is stopped (Step S35).

On the other hand, when the difference between the output value of the angle sensor 103 and the output of the sensor output expected value creating unit 112 is within the range of the determination threshold, the angle sensor 103 and the motor control system are determined to be normal (No in Step S34) and the motor control by the MPU 108 is continued.

Figure 4:
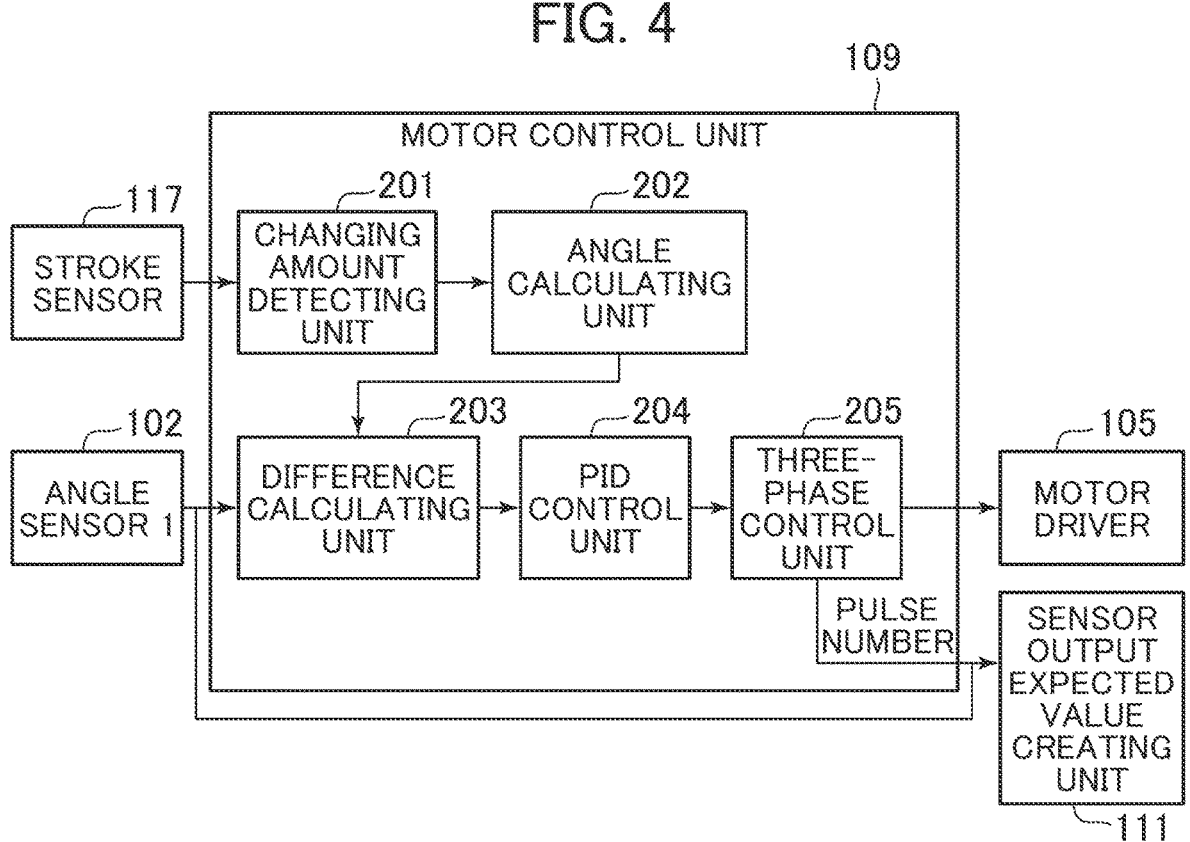
FIG. 4 is a block constitution view of a motor control unit 109 according to the first embodiment of the invention.

Next, with reference to FIG. 4, a structure of the motor control unit 109 will be described. FIG. 4 is a block constitution view of the motor control unit 109 according to the first embodiment of the invention.

A changing amount detecting unit 201 is a means for detecting a changing amount of the brake pedal according to an input signal from the stroke sensor 117. The input signal from the stroke sensor 117 is a command value for controlling the motor.

An angle calculating unit 202 is a means for converting the changing amount of the stroke sensor into a target angle (control angle) realized by the rotation of the motor.

A difference calculating unit 203 is a means for calculating a difference between the current angle information input from the sensor 102 and the target angle obtained by the angle calculating unit 202.

A PID control unit 204 is a means for controlling a force applied to the motor according to the difference amount of the difference calculating unit 203 to calculate a torque amount generated in the motor in every control period.

A three-phase control unit 205 is a means for controlling a frequency, phase, and pulse duty of three-phase pulse output according to the output of the PID control unit 204, further counting the pulse number, and outputting the total count number per every control period. Although it is not illustrated, the motor control unit 110 has the same structure as the above.

Figure 5:
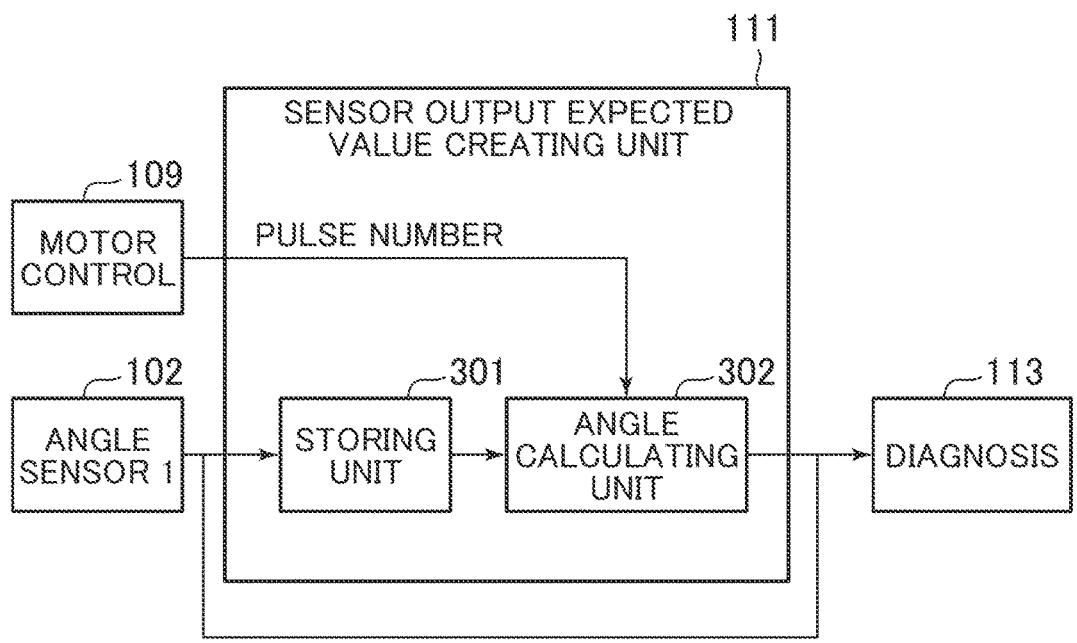
FIG. 5 is a block constitution view of a sensor output expected value creating unit 111 according to the first embodiment of the invention.

Next, with reference to FIG. 5, a structure of the sensor output expected value creating unit 111 will be described. FIG. 5 is a block constitution view of the sensor output expected value creating unit 111 according to the first embodiment of the invention.

A storing unit 301 is a means for storing the output one control period before of the angle sensor 102.

An angle calculating unit 302 is a means for calculating an angle rotated by the current motor control from the angle before one control period and the pulse number output to the motor in the current control. This value is defined as an output expected value of the angle sensor. Although it is not illustrated, the sensor output expected value creating unit 112 has the same structure as the above.

Figure 6:
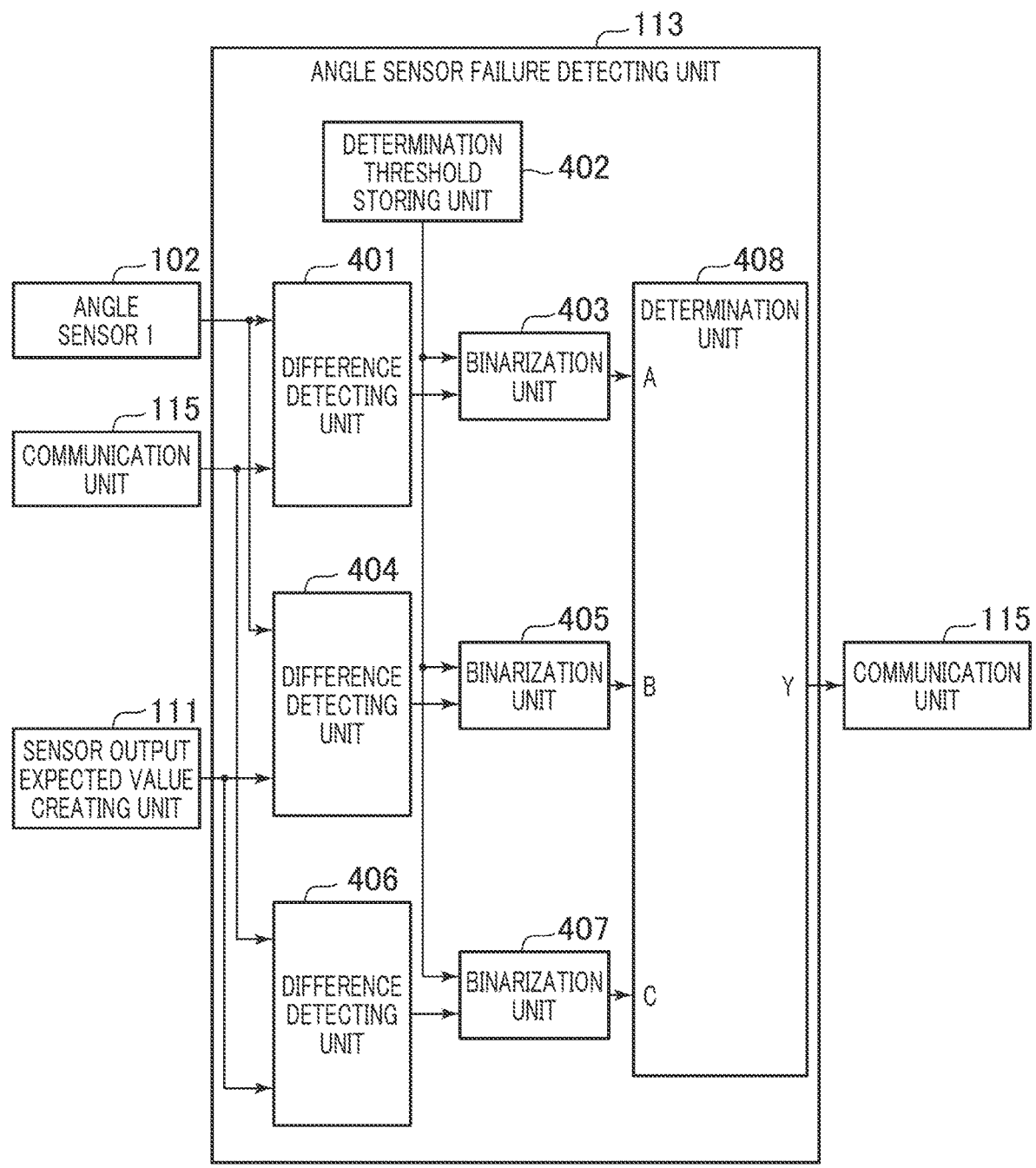
FIG. 6 is a block constitution view of an angle sensor failure detecting unit 113 according to the first embodiment of the invention.

Next, with reference to FIG. 6, a structure of the angle sensor failure detecting unit 113 will be described. FIG. 6 is a block constitution view of the angle sensor failure detecting unit 113 according to the first embodiment of the invention.

Each of difference detecting units 401, 404, and 406 is a means for obtaining a difference between two input values, further obtaining the absolute value thereof, and outputting the above.

A determination threshold storing unit 402 is a means for storing a threshold for determining whether or not the angle sensor 102 is normal.

Each of binarization units 403, 405, and 407 compares the threshold stored in the determination threshold storing unit 402 with the input value from each of the difference detecting units 401, 404, and 406: when the difference detected value is the determination threshold or less, the above unit outputs "1" which means normal and otherwise, outputs "0" which means a failure.

The determination unit 408 is a means for determining whether the motor control system (the MPU 107, the motor driver 105, and the motor 104) including the angle sensors 102 and 103, the MPU 107, the motor driver 105, and the motor 104, according to the input values from the three binarization units 403, 405, and 407. Although it is not illustrated, the angle sensor failure detecting unit 114 has the same structure as the above.

Next, with reference to FIG. 7, a determination example of the determination unit 408 in each of the angle sensor failure detecting units 113 and 114 is described. FIG. 7 is a view showing a determination example of the angle sensor failure detecting unit according to the first embodiment of the invention. FIG. 7 indicates the output results of the output Y as for the inputs A, B, and C.

In FIG. 7, the breakdown of Y is three of the angle sensor 102, the angle sensor 103, and the motor control system. When the inputs A, B, and C from the binarization units 403, 405, and 407 entered to the determination unit 408 are all "1", all are determined to be normal. While when the inputs A, B, and C are all "0", the two angle sensors and the motor control system are all determined to fail.

Of the inputs A, B, and C, when the input C is "1" and the others are "0", the angle sensor 102 is determined to fail. Of the inputs A, B, and C, when the B is "1" and the others are "0", the angle sensor 103 is determined to fail. Of the inputs A, B, and C, when the A is "1" and the others are "0", the motor control system to fail.

According to this embodiment, even when one of the angle sensors and the motor control system fail, the other angle sensor and the motor control system can be used to continue the motor control. In this case, according to the embodiment, any sensor other than the above angle sensors is not newly used, and therefore, it is possible to realize the redundancy while suppressing an increase in the number of the parts and the number of the connection signal lines.

Second Embodiment

Figure 8:
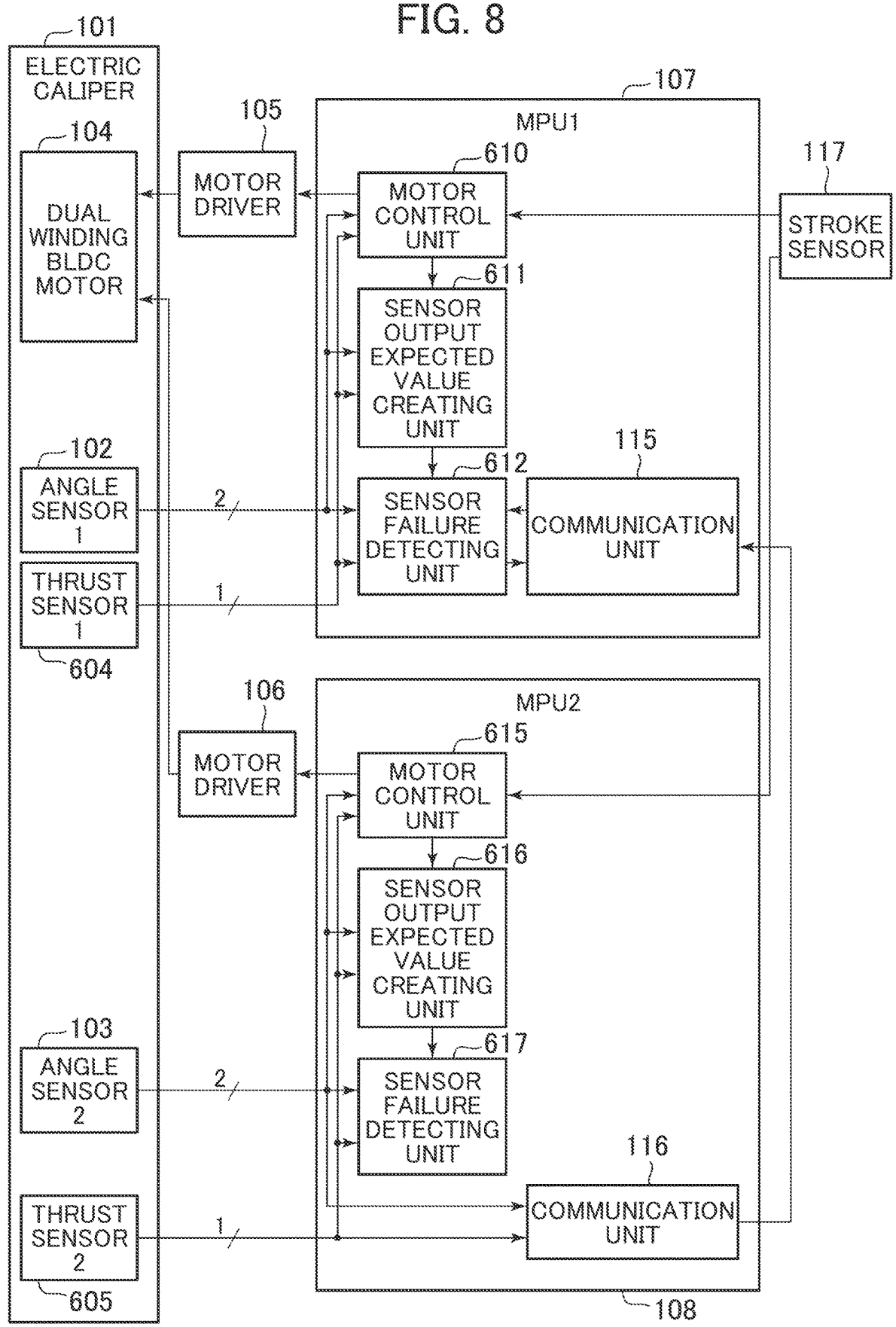
FIG. 8 is a block constitution view of an electric brake control device according to a second embodiment of the invention.

Next, a second embodiment of the invention will be described with reference to FIG. 8. FIG. 8 is a block constitution view of an electric brake control device according to the second embodiment of the invention. The second embodiment is different from the first embodiment in that thrust sensors 604 and 605 are provided.

The electric caliper 101 is provided with the dual winding brushless DC motor 104, the angle sensors 102 and 103 for detecting the rotation angle of the shaft of this dual winding brushless DC motor 104, and a thrust sensor 604 (first thrust sensor) and a thrust sensor 605 (second thrust sensor). The thrust sensors 604 and 605 are means for detecting pressures of the brake pad against the brake disk. This output value is used to determine the braking force.

The dual winding brushless DC motor 104 in the second embodiment is composed of dual system each including three coil windings arranged around the rotation, similarly to that of the first embodiment, and even when some winding of one system is broken, the windings of the other system are conducted, hence to prevent the rotation stop of the motor.

The motor control units 610 and 615 control the rotation angle and the rotation speed of the motor according to the inputs of the stroke sensor 117, the angle sensors 102 and 103, and the thrust sensors 604 and 605.

The sensor output expected value creating units 611 and 616 are means for creating each output expected value for determining whether or not each output of the angle sensors 102 and 103 and the thrust sensors 604 and 605 is normal.

The sensor output expected value creating units 611 and 616 create the respective output expected values corresponding to the respective sensors of the angle sensor and thrust sensor. Further, the sensor output expected value creating units 611 and 616 calculate the output expected values of the thrust sensors 604 and 605 at the current point from the pulse number input of the motor control unit 109 and the output values of the thrust sensors 604 and 605 before one control period and output the above values, similarly to the sensor output expected value creating unit 111 in the angle sensor as shown in FIG. 5.

The sensor failure detecting units 612 and 617 are means for detection a failure in the angle sensors 102 and 103 and the thrust sensors 604 and 605. Each of the sensor failure detecting units 612 and 617 in the second embodiment is provided with a function as the angle sensor failure detecting unit and a function as the thrust sensor failure detecting unit. The failure detection of the angle sensors 102 and 103 and the thrust sensors 604 and 605 is executed in the same processing as shown in the structure of FIG. 6. In this case, the angle sensor 102 of FIG. 6 is replaced with the thrust sensor 604, to perform the failure detection of the thrust sensors 604 and 605 and the sensor output expected value creating unit 111 creates the output expected value of the thrust sensor.

According to this embodiment, even when the angle sensor, the thrust sensor, and the motor control system in one system fail, the other angle sensor, thrust sensor, and motor control system can be used to continue the motor control. At this time, the embodiment can realize the redundancy while suppressing an increase in the number of the parts and the number of the connection signal lines.

LIST OF REFERENCE SIGNS

101: electric caliper, 102: angle sensor, 103: angle sensor, 104: dual winding brushless DC motor, 105: motor driver, 106: motor driver, 107: MPU, 108: MPU, 109: motor control unit, 110: motor control unit, 111: sensor output expected value creating unit, 112: sensor output expected value creating unit, 113: angle sensor failure detecting unit, 114: angle sensor failure detecting unit, 115: communication unit, 116: communication unit, 117: stroke sensor, 201: changing amount detecting unit, 202: angle calculating unit, 203: difference calculating unit, 204: PID control unit, 205: three-phase control unit, 301: storing unit, 302: angle calculating unit, 401: difference detecting unit, 402: determination threshold storing unit, 403: binarization unit, 404: difference detecting unit, 405: binarization unit, 406: difference detecting unit, 407: binarization unit, 408: determination unit, 604: thrust sensor, 605: thrust sensor, 610: motor control unit, 611: sensor output expected value creating unit, 612: sensor failure detecting unit, 615: motor control unit, 616: sensor output expected value creating unit, 617: sensor failure detecting unit

The invention claimed is:

1. An electric brake control device comprising:
a motor for opening and closing a brake caliper pinching a brake disc;
a first angle sensor and a second angle sensor for detecting a rotation angle of the motor;
a stroke sensor for detecting a stepping amount of a brake pedal;
a first control circuit for controlling the motor based on the stepping amount detected by the stroke sensor and receiving a detected value of the first angle sensor;
wherein the first control circuit comprises a first microcomputer; and
a second control circuit for controlling the motor based on the stepping amount detected by the stroke sensor and receiving a detected value of the second angle sensor, wherein the second control circuit comprises a second microcomputer; and wherein:
the first microcomputer is configured to transmit signals to and receive signals from the second microcomputer,
the first microcomputer is configured to calculate a control angle of the motor based on the stepping amount detected by the stroke sensor, and
the first microcomputer is configured to detect a failure of the first angle sensor and a failure of the second angle sensor, according to (i) the detected value of the first angle sensor, (ii) the detected value of the second angle sensor received from the second microcomputer (iii) the control angle of the motor, and (iv) a determination threshold.

2. The device according to claim 1, further comprising a first thrust sensor and a second thrust sensor for detecting a pressurizing force of the brake caliper against the brake disc, in which
the first microcomputer detects a failure of the first thrust sensor and a failure of the second thrust sensor, according to a detected value of the first thrust sensor, a detected value of the second thrust sensor received from the second microcomputer, and the control angle of the motor created in accordance with the stepping amount detected by the stroke sensor.

3. An electric brake controlling method, in which
a motor for opening and closing a brake caliper pinching a brake disc,
a first angle sensor and a second angle sensor for detecting a rotation angle of the motor,
a stroke sensor for detecting a stepping amount of a brake pedal, a first control circuit for controlling the motor based on the stepping amount of the stroke sensor and receiving a detected value of the first angle sensor, wherein the first control circuit comprises a first microcomputer, and
a second control circuit for controlling the motor based on the stepping amount of the stroke sensor and receiving a detected value of the second angle sensor, wherein the second control circuit comprises a second microcomputer, are provided, and wherein:
the first microcomputer is configured to transmit signals to and receive signals from the second microcomputer,
the first microcomputer is configured to calculate a control angle of the motor based on the stepping amount of the stroke sensor, and
the first microcomputer is configured to detect a failure of the first angle sensor and a failure of the second angle sensor,
the above method comprising the steps of:
inputting the detected value of the first angle sensor to the first microcomputer;
inputting the detected value of the second angle sensor received from the second microcomputer to the first microcomputer;
calculating the control angle of the motor; and
performing a failure diagnosis according to (i) the detected value of the first angle sensor, (ii) the detected value of the second angle sensor, (iii) the control angle of the motor, and (iv) a determination threshold.

4. The method according to claim 3, in which
the first microcomputer is configured to use the determination threshold for determining a presence or an absence of the failure of the second angle sensor,
the above method comprising a step of comparing an output difference between the detected value of the second angle sensor and the control angle of the motor created in accordance with the stepping amount of the stroke sensor with the determination threshold and performing a failure determination of the second angle sensor, in the first microcomputer.

5. The method according to claim 4, comprising
a step of, after the second angle sensor is determined to be normal, comparing an output difference between the detected value of the first angle sensor and the control angle of the motor created in accordance with the stepping amount of the stroke sensor with the determination threshold and performing a failure determination of the first angle sensor, in the first microcomputer.

6. The method according to claim 5 comprising a step of, after the first angle sensor and the second angle sensor are determined to be normal, performing a failure determination of the first control circuit, according to the detected value of the first angle sensor, the detected value of the second angle sensor, the control angle of the motor created in accordance with the stepping amount of the stroke sensor, and the determination threshold, in the first microcomputer.

* * * * *